(12) United States Patent
Tanner

(10) Patent No.: US 7,628,676 B2
(45) Date of Patent: Dec. 8, 2009

(54) MACHINE TOOL FOR MACHINING WORKPIECES

(75) Inventor: Hans Tanner, Hünibach (CH)

(73) Assignee: Fritz Studer AG (CH)

( * ) Notice: Subject to any disclaimer, the term of this patent is extended or adjusted under 35 U.S.C. 154(b) by 482 days.

(21) Appl. No.: 10/590,747

(22) PCT Filed: Feb. 3, 2005

(86) PCT No.: PCT/CH2005/000059

§ 371 (c)(1),
(2), (4) Date: Aug. 25, 2006

(87) PCT Pub. No.: WO2005/080048

PCT Pub. Date: Sep. 1, 2005

(65) Prior Publication Data

US 2007/0173178 A1    Jul. 26, 2007

(30) Foreign Application Priority Data

Feb. 25, 2004    (CH) ..................... 0314/04

(51) Int. Cl.
*B24B 49/00*    (2006.01)
(52) U.S. Cl. ............... 451/8; 451/411; 451/397
(58) Field of Classification Search ........... 451/5, 451/8, 10, 11, 69, 411, 397, 398, 402
See application file for complete search history.

(56) References Cited

U.S. PATENT DOCUMENTS

| | | | | |
|---|---|---|---|---|
| 2,390,521 A | * | 12/1945 | De Vlieg | 451/281 |
| 2,429,250 A | * | 10/1947 | Wiken et al. | 451/274 |
| 2,927,703 A | * | 3/1960 | Smith et al. | 414/626 |
| 2,952,280 A | * | 9/1960 | Dorsey et al. | 144/48.3 |
| 2,990,658 A | * | 7/1961 | Praeg et al. | 451/253 |
| 3,247,621 A | | 4/1966 | W.F. Aller | 51/134.5 |
| 4,545,271 A | | 10/1985 | Romi | 82/32 |
| 4,627,168 A | * | 12/1986 | Maples | 33/705 |
| 4,754,574 A | | 7/1988 | Clough et al. | 51/105 |
| 4,802,311 A | * | 2/1989 | Scheder et al. | 451/17 |
| 4,924,632 A | | 5/1990 | Beyer et al. | 51/105 |
| 5,335,454 A | * | 8/1994 | Ilek et al. | 451/9 |
| 5,738,572 A | | 4/1998 | Giebmanns | 451/221 |
| 6,411,861 B1 | * | 6/2002 | Clewes et al. | 451/5 |

(Continued)

FOREIGN PATENT DOCUMENTS

CA    2339020    2/2000

(Continued)

OTHER PUBLICATIONS

International Search Report PCT/CH2005/000059 dated Jun. 28, 2005 (European Patent Office).

(Continued)

*Primary Examiner*—Maurina Rachuba
(74) *Attorney, Agent, or Firm*—Ostrolenk Faber LLP

(57) ABSTRACT

The invention relates to a machine tool for machining workpieces, comprising a workpiece holder. Said workpiece holder comprises a support, a workpiece spindle head mounted on a first side of the support, and a tailstock. Said tailstock is mounted on a second side of the support which is different from the first side in a manner so as to be displaceable.

17 Claims, 4 Drawing Sheets

U.S. PATENT DOCUMENTS 6,682,403 B1 * 1/2004 Laycock ................. 451/49
2002/0003415 A1 * 1/2002 Nakai et al. ............. 318/569

FOREIGN PATENT DOCUMENTS

DE           201 05 430 U1   7/2001
GB           266472          2/1927
GB           1191024         6/1968

OTHER PUBLICATIONS

Germany Search Report CH 3142004 dated Sep. 24, 2004 (European Patent Office).

* cited by examiner

MACHINE TOOL FOR MACHINING WORKPIECES

CROSS REFERENCE TO RELATED APPLICATION

The present application is a 35 U.S.C. §§ 371 national phase conversion of PCT/CH2005/000059, filed 3 Feb. 2005, which claims priority of Swiss Application No. 314/04, filed 25 Feb. 2004. The PCT International Application was published in the German language.

BACKGROUND OF THE INVENTION

The present invention relates to a machine tool for machining workpieces according to the preamble of claim 1.

A machine tool with a grinding device and a workpiece holding device is described in the German utility model no. 201 05 430.2. The workpiece holding device has the disadvantage that, on account of the set-up, there is no possibility of using measuring instruments as are required for precise cylindrical grinding by means of in-process work-size control. The workpiece holding device is therefore not suitable for achieving close manufacturing tolerances. It is also formed such that it can travel between the machining and the workpiece accommodation station. However the travel of the workpiece holding device is significantly longer than would be necessary for the actual machining of the workpiece. This means that the machine tool has a substantially extended machine bed and is accordingly expensive and complicated to produce.

The grinding device according to the above-mentioned utility model comprises two grinding tools, which are fitted to opposite ends of a driven shaft, and is formed so as to be pivotable, so that a workpiece can be machined alternatively by one of the two grinding tools. The disadvantage of this lies in the fact that the grinding tools can only be used in an inclined position, as they could collide with the workpiece holding device if oriented perpendicularly. This means that operations in which the grinding tool has to be oriented perpendicularly, such as the machining of grooves, cannot be carried out. A further disadvantage lies in the fact that the pivotable grinding device requires a considerable amount of space and is expensive.

Moreover, where the machine tool as described in the above-mentioned utility model is concerned, no special measures are provided to protect the grinding and turning tools disposed below the workpiece against accumulations of material arising in the form of chips, for example, when machining a workpiece.

SUMMARY OF THE INVENTION

Taking this prior art as a starting point, one object of the present invention is to develop a machine tool of the type initially mentioned such that it enables workpieces to be machined with greater precision.

This object is solved by a machine tool according to claim 1. The additional claims indicate preferred constructions.

The machine tool according to the invention has, inter alia, the advantage that it can be used, for example, to machine a workpiece in the same set-up through precise cylindrical grinding and turning.

BRIEF DESCRIPTION OF THE DRAWINGS

The invention is illustrated in the following on the basis of an embodiment and with reference to figures, in which.

DESCRIPTION OF A PREFERRED EMBODIMENT

Figure 1:
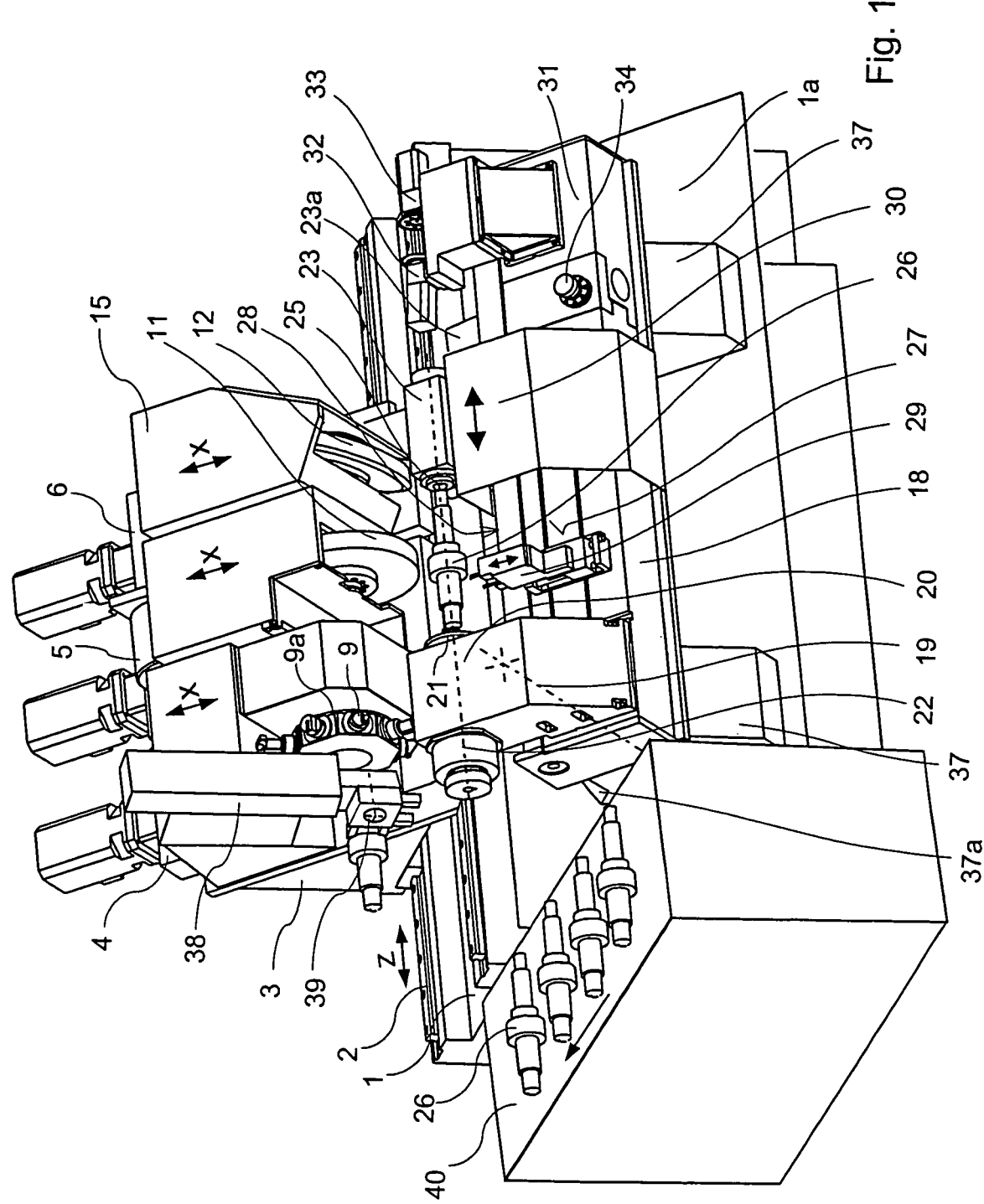
FIG. 1 is a perspective view of a machine tool with grinding devices according to the invention as well as a workpiece holding device according to the invention.

As can be seen from FIG. 1, the machine tool comprises a machine bed 1 with horizontal longitudinal guides 2 and a slide 3. The slide 3 can travel along the longitudinal guides 2 in the Z-direction, as indicated by the double arrow Z in FIG. 1. Tool units 4, 5, 6, which contain the machining tools 9, 11, 12 for machining a workpiece 26, are disposed side by side at the front longitudinal side of the slide 3. The tool units 4, 5, 6 are disposed parallel to one another, so that the tool axes of the respective machining tools 9, 11, 12 are coaxial with the Z-direction. (Cf. also the reference character 10 in FIG. 2, which shows the position of the tool axes when the three machining tools 9, 11, 12 are in the rest position.) The machining tools 9, 11, 12 are also in each case fitted on a tool feed slide which can travel transversely to the Z-direction, as indicated by the double arrow X in FIG. 1. The X- and the Z-direction are orthogonal to one another. The machining tools 9, 11, 12 can be brought into contact with the face of the workpiece 26 which is to be machined by travelling in the X- and the Z-direction.

In the example according to FIG. 1 the first tool unit 4 is formed as a turning device for cutting the workpiece 26, the tool units 5 and 6 in each case being grinding devices which are suitable for the cylindrical grinding of a workpiece 26, in particular external cylindrical grinding and face grinding.

Figure 2:
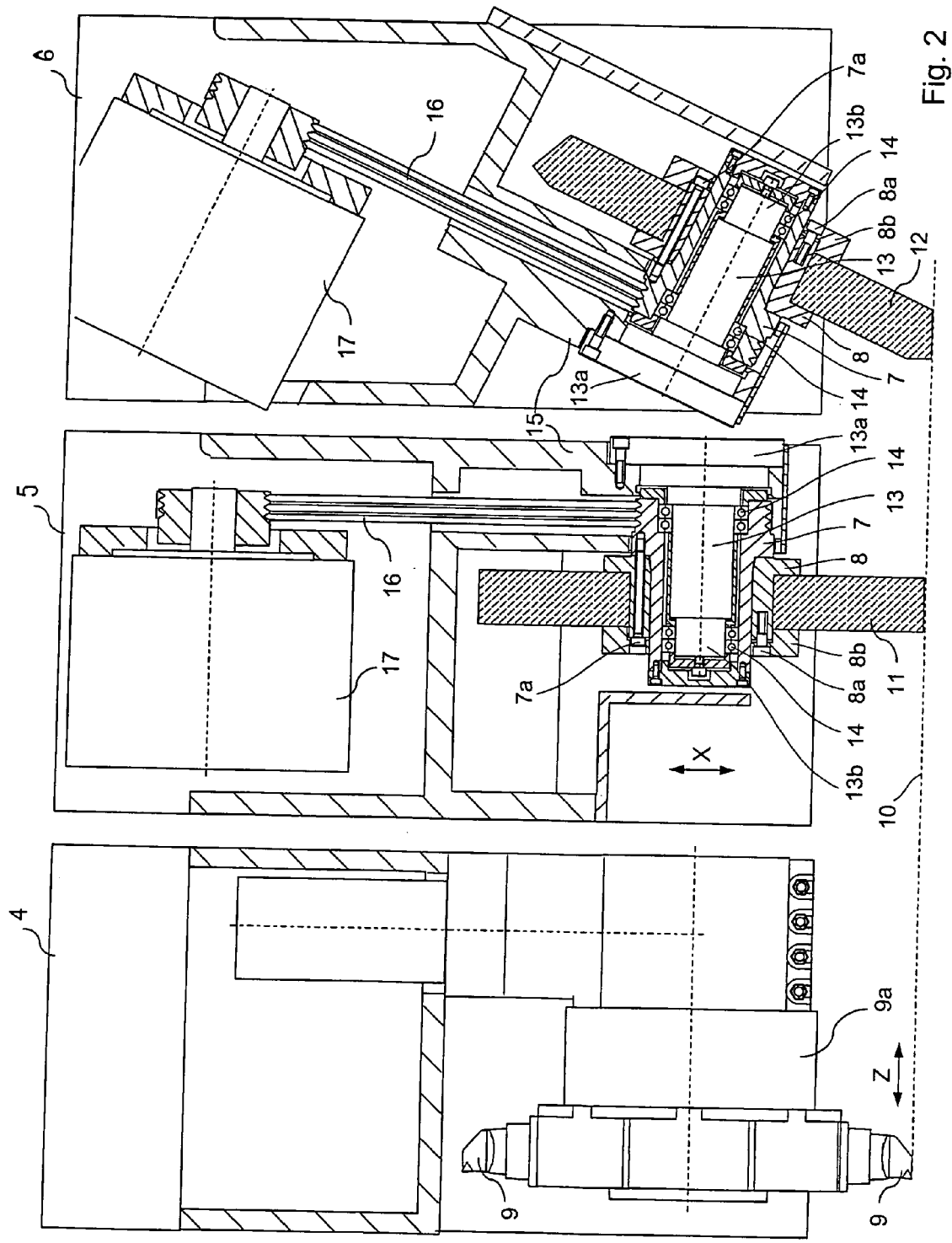
FIG. 2 shows the machining tools of the machine tool according to FIG. 1 in a sectional view from the front.

As is also shown by FIG. 2, the turning device 4 comprises a turning tool turret 9a on which turning tools 9 are disposed. The turning tool 9 required for the respective machining process can be made available by rotating the turning tool turret 9a.

The grinding devices 5 and 6 in each case comprise a grinding tool 11 and 12, respectively, in the form of a grinding wheel which is held on a tool carrier 7 by means of a holder 8, 8a, 8b, as well as a stationary (mechanical) arbor 13, about which the grinding tool 11 or 12 can rotate.

The holder comprises a cylindrical holding part 8 with an end stop for receiving the grinding tool 11 or 12 and an annular head part 8b. This is fastened to the holding part 8 by means of a releasable connection 8a, e.g. in the form of screwed connections, so that the grinding tool 11 or 12 is clamped between the stop of the holding part 8 and the head part 8b. The holder 8, 8a, 8b and the grinding tool 11 or 12 form an interchangeable unit which is fastened to the tool carrier by means of a releasable connection 7a, e.g. in the form of screwed connections.

The tool carrier 7 comprises a sleeve which is supported such that it can rotate by bearing means 14 on the stationary arbor 13. Suitable bearing means 14 are rolling contact bearings, in particular ball bearings, which are in each case disposed at the end on the cantilevered part of the stationary arbor 13. The grinding tool 11 or 12 is disposed within the cantilevered length of the stationary arbor 13, whereby a compact structure is guaranteed. The lateral extent of the grinding tool 5 or 6, i.e. in the Z-direction, is in particular relatively narrow. This enables the tool units 4, 5 and 6, in particular the two grinding devices 5 and 6, to be disposed near one another, so that the slide 3 need only travel over a relatively short distance in the Z-direction in order to be able to feed the respective machining tool 9, 11 or 12 to the workpiece 26. Moreover, it is also possible, on account of this compact type of construction, to dispose the grinding tool at an inclination with respect to the X-direction in order that a workpiece 26 may thus be machined by face grinding side faces and also by external cylindrical grinding. In the example according to FIG. 2 the grinding device 6 is disposed at an angle in relation to the grinding device 5 or tool axis 10, so that side faces of the workpiece 26 can also be machined by means of the grinding tool 12.

As is also shown by FIG. 2, the stationary arbor 13 is firmly connected on one side 13*a* to the tool box 15, e.g. by screwing it on, the other end 13*b* of the arbor 13 being cantilevered. This arrangement enables the grinding tool 11 or 12 to be easily detached by releasing the connections 7*a* and guiding the holder 8, 8*a*, 8*b* together with the grinding tool 11 or 12 over the cantilevered end 13*b* of the arbor 13. The bearing means 14 therefore remain in position and are not replaced when the grinding tool 11 or 12 is changed.

It is also conceivable to connect the stationary arbor 13 to the tool box 15 on both sides 13*a* and 13*b*, so that the grinding tool 11 or 12 is disposed in between. This arrangement also has the advantage of a small lateral extent, although it is more difficult to detach the grinding tool, as it is necessary to at least partly detach the tool box 15 and/or the stationary arbor 13.

A respective drive 17 serves to drive the grinding tool 11 or 12, this drive being laterally staggered relative to the stationary arbor 13, above the stationary arbor 13 in the example according to FIG. 2. Power is transmitted by means of a V-belt 16, which is disposed between the end 13*a* of the stationary arbor 13 and the grinding tool 11 or 12, so that the tool carrier 7 is coupled to the drive shaft of the drive 17. A three-phase motor, for example, is suitable as the drive 17.

Returning to FIG. 1, this also shows a workpiece holding device which comprises a workpiece spindle headstock 20 and a tailstock 23 as well as a bar 18 as the support. In order to hold and drive a workpiece 26, the workpiece spindle headstock 20 is provided with holding means 21 such as a centre point or a chuck. The tailstock 23 has a counterpoint 25 for holding and clamping the workpiece 26 and is fastened to a slide 23*a* which can be displaced along guides in order to enable the distance between the holding means 21 and the counterpoint 25 to be adapted to the length of the workpiece 26. (Cf. the reference character 24, which denotes the guides.) For machining purposes the workpiece 26 is clamped between the holding means 21 and the counterpoint 25 and rotated about the workpiece axis 22, which is defined by the axis of rotation of the spindle of the workpiece spindle headstock 20.

The support 18 can be pivoted about a pivot axis 19 which is transverse to the Z-direction resp. to the tool axis 10, the two axes 10 and 19 preferably being orthogonal to one another. By pivoting the support 18, the workpiece axis 22 can be precisely oriented in relation to the tool axis 10, for example in order to compensate for cylindrical errors, so that accurate machining of shaft-shaped workpieces 26 in particular is guaranteed. If necessary, it is also possible to machine conical faces on the workpiece 26 in addition to cylindrical faces by appropriately pivoting the support 18.

The workpiece spindle headstock 20 is fastened to the front side 27 of the support 18, while the tailstock 23 is fitted to a side of the support 18 which is different from the front side 27, this corresponding to the top side 28 of the support 18 in the example according to FIG. 1. Other variants in terms of fitting the workpiece spindle headstock 20 and the tailstock 23 to different sides of the support 18 are also possible: for example, fitting the tailstock 23 to the rear side of the support 18 and the workpiece spindle headstock 20 to the front side 27 or the tailstock 23 to the front side 27 and the workpiece spindle headstock 20 to the top side 28 or rear side of the support 18. The advantage of fitting the workpiece spindle headstock 20 and the tailstock 23 to different sides lies in the fact that further devices 29 can be fitted to the side 27 to which the workpiece spindle headstock 20 is fitted without them colliding with the tailstock 23 when this is displaced.

In the example according to FIG. 1 a measuring device 29 is fitted as a further device to the front side 27 of the support 18, this device serving to acquire measured variables, in particular while machining a workpiece 26. The measuring device 29 comprises measuring instruments for acquiring diameters and certain lengths at the workpiece 26 and is disposed such that it can be displaced along the front side 27. The measuring instruments and the grinding tool 11 or 12 can be brought into contact with the workpiece 26 at the same time without any risk of them colliding with one another or with the workpiece spindle headstock 20 or the tailstock 23. It is as a result possible to achieve precise grinding by means of in-process work-size control, in the case of which measurement data are acquired by means of the measuring device 29 while machining a workpiece 26 in order to control the position of the grinding tool 11 or 12 according to the dimensions of the workpiece 26 which are to be obtained.

The support 18 comprises protective means 30 with which the measuring instruments of the measuring device 29 can be protected. The protective means 30 comprise, for example, an angular cover which can be displaced in translatory fashion along the support 18. It is also possible to use a protective cover which can be swung up and down as the protective means 30. The protective means 30 serve to protect the measuring instruments of the measuring device 29 against damage, for example when the workpiece 26 is machined with the turning tool 9. This machining process produces red-hot chips which, without the provision of the protective means 30, would damage the sensitive measuring instruments of the measuring device 29.

The support 18 which is shown in FIG. 1 is in the form of a bar with a rectangular cross section, so that the front side 27 and the top side 28 lie at a right angle to one another. A bar with a different cross section, for example triangular or polygonal, would also be suitable as a support 18 for enabling the workpiece spindle headstock 20 and the tailstock 23 to be fitted to different sides.

A support box 31, which is firmly connected to the machine bed 1 and to the front side of which dressing tools 32 and 33 are fastened, is disposed adjacent to the support bar 18. These tools serve to dress the grinding tools 11 and 12. The workpiece spindle headstock 20, the measuring device 29 as well as the dressing tools 32 and 33 are therefore disposed at the side which faces the user.

A fine adjustment device 34, which is located in the support box 31, serves to pivot the support 18 about the pivot axis 19 in order, as described above, to enable the workpiece axis 22 to be oriented according to the required conicity at the workpiece 26.

The machine bed 1 is formed as an inclined bed, for which purpose the front face 1*a* is appropriately disposed with respect to the horizontal. Brackets 37, for example in the form of two, laterally staggered cantilevers, to which the support 18 is fastened, are fitted to the face 1a. The support 18 is thereby disposed at a spacing from the machine bed 1, so that a passage is formed and the material arising during machining, such as chips, cooling lubricant and the like, can fall down between the machine bed 1 and the support 18. The top faces 37a of the brackets 37 are bevelled in order to prevent any material from remaining on the latter.

Figure 3:
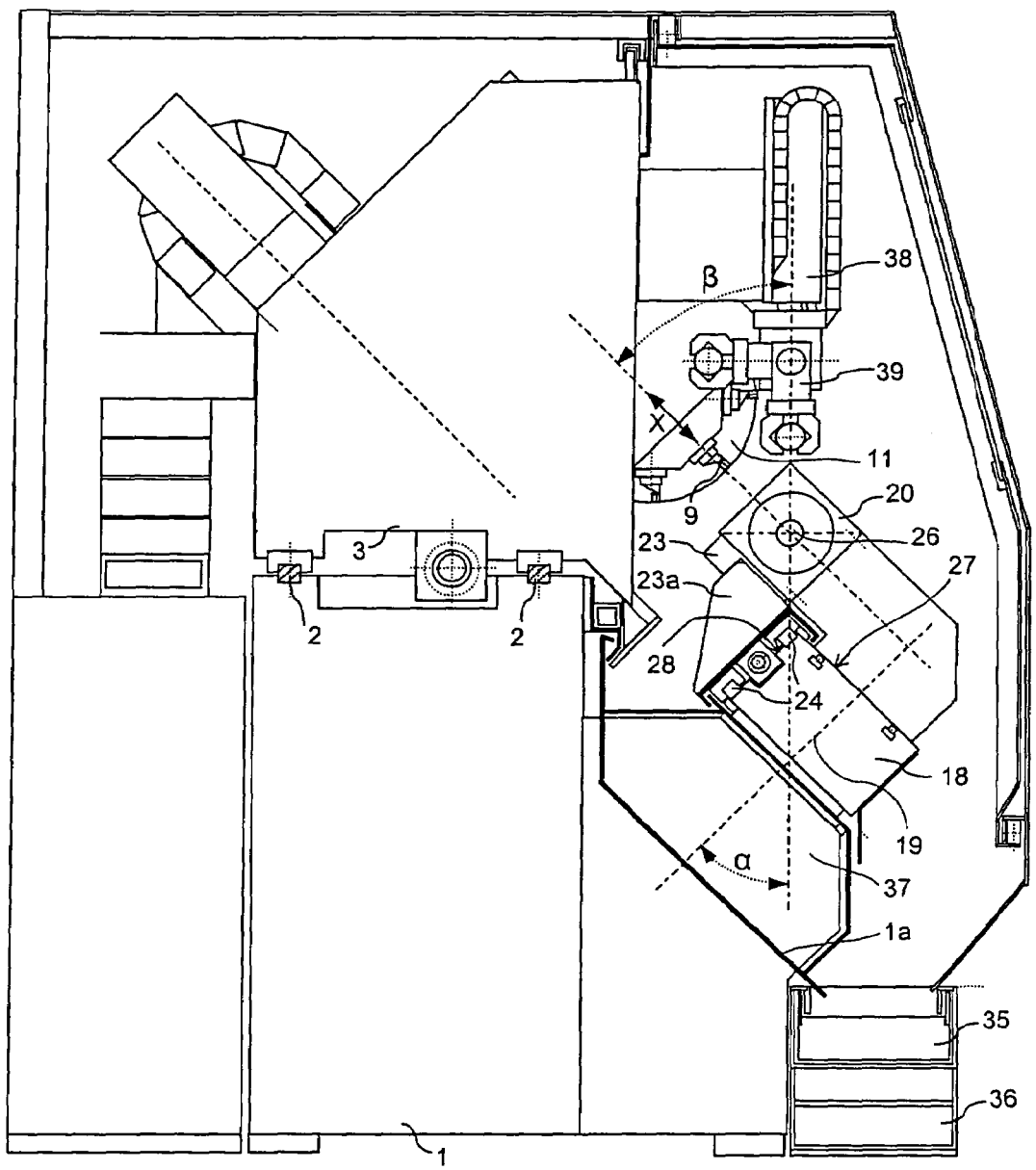
FIG. 3 is a partly sectional side view of the machine tool according to FIG. 1 together with the outer protective covering.

As shown in particular by FIG. 3, the workpiece holding device 18, 20, 23 is disposed at an inclination, so that this is largely without any horizontal faces. The support 18 is fastened to the brackets 37 such that it is inclined by a certain angle α with respect to the vertical, so that its top side 28 and front side 27 as well as the faces of the workpiece spindle headstock 20 as well as the tailstock 23 are in particular disposed at an inclination to the horizontal. The angle α is preferably 45 degrees, although it may also be greater or smaller, depending on the purpose. The pivot axis 19 is perpendicular to the front side 27 of the support 18 and is therefore likewise inclined by the angle α with respect to the vertical.

By providing inclined faces in the machining space, in particular those which are disposed below the machining tools 4, 5, 6 and face the latter, such as the faces 1a, 27, 28 and 37a, the material arising during machining can be routed downwards. All the faces in the machining space are preferably disposed at an inclination, in particular perpendicularly, so that the material can fall down on all sides and is largely prevented from remaining on the support 18, workpiece spindle headstock 20 or tailstock 23, for example. It is of course not necessary for the inclined faces to be plane in order to remove the material; these may instead also be curved or rounded.

A collecting device is provided at the bottom at the machine bed 1 in order to collect the falling material, this device comprising a chip conveyor 35 and a cooling lubricant collecting trough 36. The solid material in particular can be carried away to an end location by means of the chip conveyor 35.

The machine tool may optionally be provided with strippers (not represented) which can be guided over certain faces in order thus to strip off adherent material. Strippers of this kind may be used, for example, to repeatedly clean the tailstock slide 23a and the brackets 37 and thus to ensure that the slide 23a can travel without any problems.

Protective coverings may also be provided to protect individual components against soiling, in particular due to the material arising during machining. As shown by FIG. 2, protective coverings are fitted to the tool box 15 of the grinding devices 5 and 6 at the side and at the bottom, for example, these coverings largely protecting the V-belt 16 and the drive 17 against soiling.

The tool units 4, 5 and 6 are disposed at an inclination, with β denoting the angle between the vertical and the X-direction of travel of the machining tools 9, 11, 12. This inclined arrangement has the advantage, inter alia, of the operator of the machine tool being able to easily see the workpiece 26, in particular the points which come into contact with the machining tool 9, 11, 12, without bending down.

In order to dispose the tool units 4, 5 and 6 in an inclined position, the Z-slide 3 is formed, for example, as a horizontal slide with a plane which is inclined by the angle β and on which the X-slides of the tool units 4, 5 and 6 are fitted. The Z-slide 3 may alternatively also be formed as a flat Z-slide which can travel in a plane inclined by the angle β due on account of the two guides 2 being staggered in height. The Z-direction of travel is also horizontal here, while the angle between the vertical and the X-direction of travel is defined by β.

The angle β is preferably equal to the angle α. The grinding tool 11 or 12 and the measuring instruments of the measuring device 29 can then be placed on the workpiece 26 on opposite sides without any risk of a collision.

A workpiece gripper device 38 is fastened to the front end of the slide 3. This can travel together with the tool units 4, 5, 6 in the Z-direction. The workpiece gripper device 38 has an arm whose end is provided with a change-over gripper 39. By means of the latter it is possible, inter alia, to remove a machined workpiece from the workpiece holding device and deliver a new workpiece without the slide 3 having to be displaced.

As is also shown by FIG. 1, a workpiece magazine 40 is provided at the left-hand end of the machine tool, from which or in which magazine workpieces 26 can be removed or deposited by means of the workpiece gripper device 38.

One possible working cycle of the machine tool is as follows.

The workpiece which is clamped in the workpiece holding device and has already been machined (denoted by A in the following) is replaced by the workpiece which is just to be machined (denoted by B in the following) by means of the change-over gripper 39. The slide 3 is in this case moved to the right-hand end position, so that the grinding tools 11 and 12 are located in the vicinity of the dressing tools 32 and 33 and, if required, can be dressed without the slide 3 travelling particularly far.

The workpiece B which has just been clamped is machined by means of the turning device 4 and then the grinding devices and 6, with the slide 3 being moved according to the machining process. Following the completion of the machining process, the slide 3 is located in the left-hand end position, so that the workpiece A having been machined in the preceding operation can be deposited in the workpiece magazine 40 and a workpiece C which is just to be machined can be taken up by means of the workpiece gripper 39.

The slide 3 is moved and the machined workpiece B replaced by the workpiece C, upon which the working cycle starts from the beginning.

The design described above of the grinding and workpiece holding device as part of a machine tool provides various advantages:

Where the grinding device 5 or 6 is concerned, the tool carrier 7, which bears the grinding tool 11 or 12, can be driven by rotating it about the stationary mechanical arbor 13. This results in a compact structure, with the lateral extent in particular being relatively narrow. This enables further tool units to be disposed parallel to the grinding device 5 or 6 in order thus to be able to carry out a plurality of machining steps, in particular turning and cylindrical grinding, in one and the same set-up. It is therefore unnecessary to rechuck, reorientate and finish-machine the workpiece on another machine tool in a time-consuming procedure.

The machine tool is suitable for finish-machining workpieces, in particular also hardened workpieces (hard finish-machining). The workpieces may be shaft-shaped, for example those for gear units, pumps, etc.; however it is also possible to machine conical and/or plane faces, with the possibility in particular of grinding grooves. The individual devices for machining and holding a workpiece are disposed such that there are no limitations relating to use on account of collisions.

If required, the grinding tools 11, 12 can be quickly and easily removed from the stationary arbor 13, in which case it is only necessary to loosen the connections 7a. It is not necessary to remove in particular the bearing means 14 or the V-belt 16 in order to change the grinding tool 11, 12.

Through fitting the workpiece spindle headstock 20 and the tailstock 23 to different sides of the support 18, the workpiece holding device is designed such that the tailstock 23 can be displaced over the entire workpiece clamping length without the possibility of a collision occurring with other parts such as the measuring device 29, dressing tools 32, 33, etc.

The use of a measuring device 29 permits in-process work-size control, so that high-precision cylindrical grinding is possible. The measuring device 29 can be protected against damage due to chips during the turning process, so that a workpiece can be machined by turning and grinding in the same set-up.

The machining tools 9, 11, 12 can be put into operation individually without any limitations due to collisions, with shorts lengths of travel and in short chip-to-chip times.

The workpiece gripper device 38 is disposed such that the travel which is required to machine a workpiece is sufficient to enable a workpiece to be transported between the workpiece magazine 40 and the workpiece holding device. The time required to load the machine tool is therefore largely integrated into the workpiece machining time.

The compact construction of the machine tool as a whole enables the workpiece machining time and therefore the manufacturing costs to be reduced.

The type and the number of the tool units can be determined according to the purpose of the machine tool. The number of grinding tools 5 or 6 may be, for example, one, two or more. If it is not necessary to machine by turning, the turning device 4 may of course be omitted. It is also possible to provide one or more grinding device(s) with standard spindles, to which the grinding tool is fitted at the end.

Figure 4:
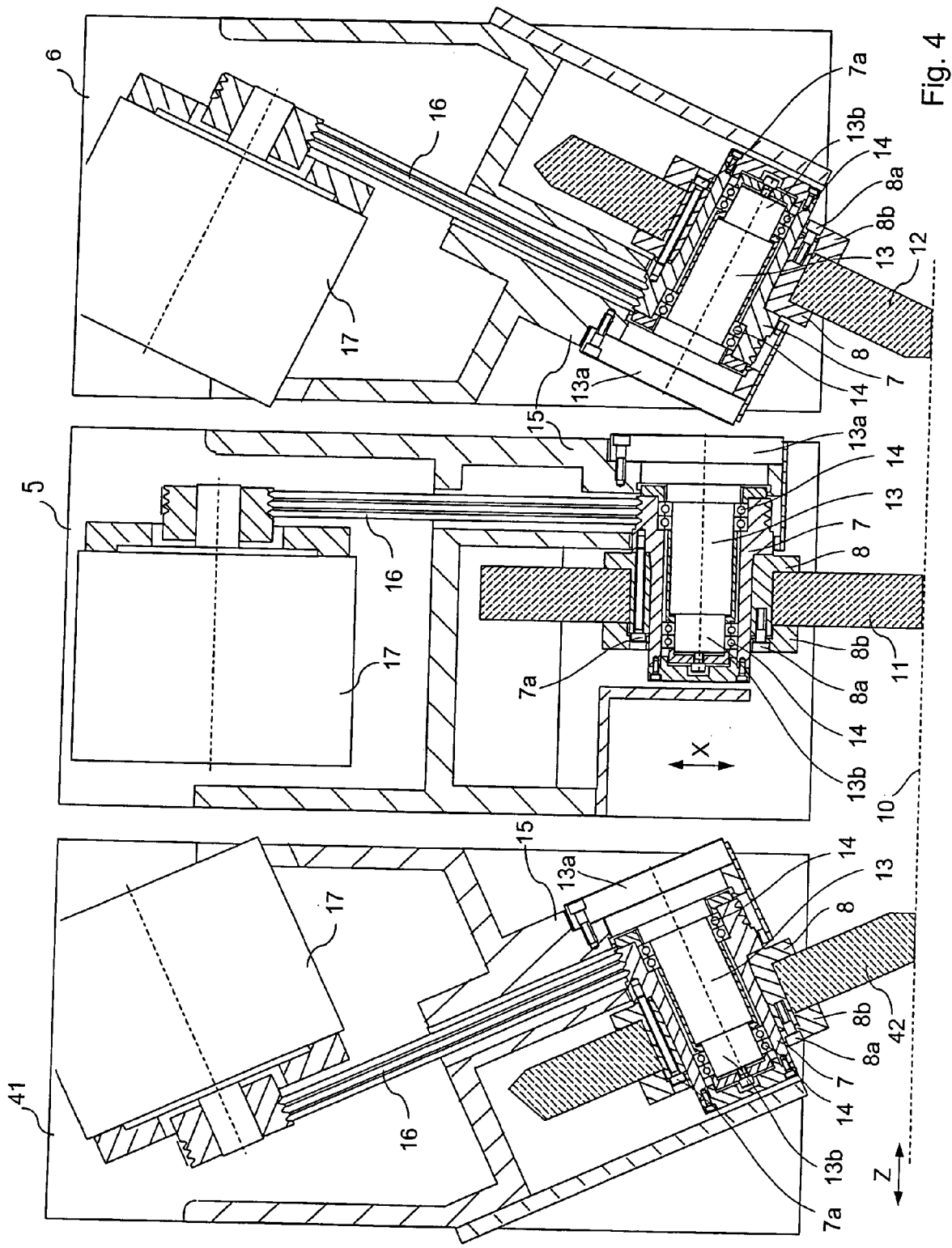
FIG. 4 is a further embodiment of the machining tools for a machine tool according to the invention in a sectional view from the front.

FIG. 4 shows an embodiment with three parallel grinding devices 5, 6 and 41, in which case the grinding device 41 may be disposed on the slide 3 instead of or in addition to the turning device 4.

Similarly to the grinding devices 5 and 6, the grinding device 41 comprises a grinding tool 42 in the form of a grinding wheel which is fastened by means of the holder 8, 8a, 8b or the connection 7a to the tool carrier 7 and can be rotated about the stationary arbor 13.

The grinding device 41 is disposed on the slide 3 at an angle in relation to the central grinding device 5 and, like the grinding devices 5 and 6, can travel in the X- and the Z-direction. It is therefore possible, through the two grinding wheels 12 and 42, which are inclined towards the centre, to machine both the side faces of a workpieces which face the workpiece spindle headstock 20 and those which face the tailstock 23 in one set-up.

It is also conceivable to provide the machine tool with different and/or further machining tools in order thus to be able to carry out a plurality of machining steps on the clamped workpiece. Examples of machining tools of this kind are those for external cylindrical grinding, internal cylindrical grinding, face grinding, turning, boring, milling, planishing, for a superfinish, honing, etc. Machining tools of this kind may be used instead of the tool units 4, 6, 41 or in combination with these, depending on the purpose.

In a further embodiment of the machine tool two or more of the tool units 4 or 41, 5, 6 are formed such that they can travel independently of one another in the X- and the Z-direction. This enables a plurality of tools to act on the workpiece 26 at the same time, so that the overall machining time can be significantly reduced.

For example, two separate Z-slides which can travel in the Z-direction are provided instead of the slide 3. An X-slide with the grinding device 41 is fitted on the first Z-slide and an X-slide with the grinding device 6 on the second Z-slide. The two grinding devices 6 and 41 are accordingly disposed on compound rest slides and can be moved independently of one another in the X- and the Y-direction. For machining purposes the two grinding tools 6 and 41 are simultaneously placed on the workpiece 26 and its faces are machined according to the manufacturing target through controlled travel of the compound rest slides in the X- or the Y-direction. The compact type of construction of the grinding devices 6 and 41 and the measure of fitting the grinding tools 12 and 42 at a certain angle enable these to be applied to the workpiece at a small angle relative to one another. It is as a result possible to machine both long and narrow workpieces on both sides at the same time.

In a simplified embodiment of the machine tool it is also possible to directly use the two brackets 37 as supports for the workpiece spindle headstock 20 or the tailstock 23 instead of the support bar 18, in which case the appropriate bracket 37 is provided with a slide in order to move the tailstock 23. This arrangement is particularly suitable for purposes which do not require a measuring device 29 and/or protective means 20.

The invention claimed is:

1. Machine tool for machining workpieces, the machine tool comprising:
a workpiece holding device including
a support having a first surface, a second surface inclined with respect to the first surface and the support having a third surface inclined with respect to the second surface,
a workpiece spindle headstock having a first workpiece supporting portion and a first mounting surface mounted on the first surface of the support, and
a tailstock having a second workpiece supporting portion and a second mounting surface, movably mounted on one of the second surface and the third surface of the support such that, when the second mounted surface is mounted on the second surface of the support, the second mounting surface is inclined with respect to the first mounting surface while the second workpiece supporting portion is aligned with the first workpiece supporting portion, and when the second mounted surface is mounted on the third surface of the support, the second mounting surface is located opposite to the first mounting surface while the second workpiece supporting portion is aligned with the first workpiece supporting portion.

2. Machine tool according to claim 1, further comprising a measuring device mounted on the first surface of the support and positioned between the workpiece spindle headstock and the tailstock to acquire measured variables during machining of a workpiece.

3. Machine tool according to claim 2, further comprising a movable protective device for protecting the measuring device.

4. Machine tool according to claim 1, wherein the support is pivotable about a pivot axis.

5. Machine tool according to claim 1, further comprising a vertical axis, wherein an angle α between the vertical axis and the side surface of the support on which the tailstock is mounted is greater than 0 degrees.

6. Machine tool according to claim 1, further comprising a turning device for cuffing a workpiece.

7. Machine tool according to claim 6, further comprising a grinding device including a grinding tool rotatable about an axis of rotation which is disposed at an angle to a longitudinal axis of the workpiece.

8. Machine tool according to claim 7, wherein the grinding device is movable along at least two axes of movement.

9. Machine tool according to claim 8, wherein the grinding device and the turning device are movable independently of one another along the two axes of movement.

10. Machine tool according to claim 8, wherein one of the two axes of movement is oriented substantially horizontally, and an angle $\beta$ between the other of the two axes of movement and a vertical axis of the machine tool is greater than 0 degrees.

11. Machine tool according to claim 1, further comprising a workpiece holding device for taking up at least two workpieces.

12. Machine tool according to claim 11, further comprising a machine bed, the workpiece holding device and the machine bed having faces which are inclined with respect to a horizontal axis of the machine tool, the faces being configured for removing material arising during machining in a downward direction.

13. Machine tool according to claim 12, wherein the workpiece holding device is fastened to brackets distanced from the machine bed.

14. Machine tool according to claim 13, wherein the machine bed is formed as an inclined bed and the brackets have bevelled faces.

15. Machine tool according to claim 1, comprising a collecting device operable for at least one of collecting and carrying away falling material.

16. Machine tool according to claim 1, further comprising at least one grinding device for cuffing a workpiece.

17. Machine tool according to claim 16 wherein the grinding device is movable along at least two axes of movement.

* * * * *

UNITED STATES PATENT AND TRADEMARK OFFICE
CERTIFICATE OF CORRECTION

PATENT NO. : 7,628,676 B2  Page 1 of 1
APPLICATION NO. : 10/590747
DATED : December 8, 2009
INVENTOR(S) : Hans Tanner It is certified that error appears in the above-identified patent and that said Letters Patent is hereby corrected as shown below:

Title Page, Item [*] Notice:

Delete the phrase "by 482 days" and insert --by 587 days--.

In claim 1, line 38, please delete the "," after the word "surface". Claim 1, line 38 should read as follows:

--tion and a second mounting surface movably--.

Signed and Sealed this

Thirty-first Day of August, 2010

David J. Kappos
*Director of the United States Patent and Trademark Office*